(12) United States Patent
Dougherty

(10) Patent No.: US 9,054,513 B2
(45) Date of Patent: Jun. 9, 2015

(54) CIRCUIT PROTECTION DEVICE AND METHODS OF CONFIGURING A CIRCUIT PROTECTION DEVICE

(71) Applicant: General Electric Company, Schenectady, NY (US)

(72) Inventor: John James Dougherty, Collegeville, PA (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 13/653,901

(22) Filed: Oct. 17, 2012

(65) Prior Publication Data

US 2014/0104736 A1    Apr. 17, 2014

(51) Int. Cl.
| | | |
|---|---|---|
| *H01H 89/00* | (2006.01) | |
| *H02H 1/00* | (2006.01) | |
| *H02H 3/093* | (2006.01) | |
| *H02H 3/00* | (2006.01) | |

(52) U.S. Cl.
CPC ............. *H02H 1/0092* (2013.01); *H02H 3/006* (2013.01); *H02H 3/0935* (2013.01)

(58) Field of Classification Search
USPC ........................................................ 361/115
See application file for complete search history.

(56) References Cited

U.S. PATENT DOCUMENTS

| | | | |
|---|---|---|---|
| 5,270,898 A * | 12/1993 | Elms et al. ...................... 361/96 |
| 5,490,086 A | 2/1996 | Leone et al. | |
| 5,943,201 A * | 8/1999 | Walker et al. ................... 361/64 |
| 6,078,489 A | 6/2000 | Messerli et al. | |
| 6,195,243 B1 * | 2/2001 | Spencer et al. ................. 361/64 |
| 6,212,049 B1 * | 4/2001 | Spencer et al. ................. 361/64 |
| 6,262,872 B1 | 7/2001 | Messerli et al. | |
| 6,546,342 B1 | 4/2003 | Dougherty et al. | |
| 6,985,784 B2 | 1/2006 | Vandevanter et al. | |
| 7,869,170 B2 | 1/2011 | Colsch et al. | |
| 7,936,547 B2 | 5/2011 | Dougherty et al. | |
| 2003/0193767 A1 | 10/2003 | Vicente et al. | |
| 2005/0047045 A1 | 3/2005 | Puskar et al. | |
| 2012/0092802 A1 | 4/2012 | Weiher | |

FOREIGN PATENT DOCUMENTS

EP        2068413 A2      6/2009

OTHER PUBLICATIONS

European Search Report and Written Opinion from corresponding EP Application No. 14150813.5 dated May 26, 2014.

* cited by examiner

*Primary Examiner* — Ronald W Leja
(74) *Attorney, Agent, or Firm* — General Electric Company

(57) ABSTRACT

A circuit protection device includes an adjustment device configured to provide a selected voltage, a memory configured to store a selector, and a processor coupled to the memory and to the adjustment device. The processor is configured to receive the selector from the memory, select an operational parameter of the circuit protection device based on the selector, receive a voltage value representative of a selected voltage provided by the adjustment device, and set the selected operational parameter to a parameter value based on the voltage value received.

20 Claims, 3 Drawing Sheets

CIRCUIT PROTECTION DEVICE AND METHODS OF CONFIGURING A CIRCUIT PROTECTION DEVICE

BACKGROUND OF THE INVENTION

The present application relates generally to power distribution systems and, more particularly, to a circuit protection device and methods of configuring a circuit protection device.

Known electrical distribution systems include one or more circuit breakers that that are each coupled to one or more loads. The circuit breakers typically include a trip unit that controls the circuit breakers based upon sensed current flowing through the circuit breakers. For example, the trip unit causes current flowing through the circuit breaker to be interrupted if the current is outside of acceptable operating conditions.

At least some known trip units are programmed with one or more current thresholds (also known as "pickup" thresholds) that identify undesired current levels for the circuit breaker. In addition, different current thresholds may be desired by customers for a particular circuit breaker design. Accordingly, some known circuit breakers include one or more adjustable components that each are associated with a separate circuit breaker setting, such as a pickup threshold. A user or a manufacturer, for example, can adjust each circuit breaker setting by adjusting the component. However, each adjustable component is typically associated with a single circuit breaker setting. Accordingly, configuration options for at least some known circuit breakers may undesirably be limited, for example, by a lack of available space to add multiple adjustable components.

BRIEF DESCRIPTION OF THE INVENTION

In one aspect, a circuit protection device is provided that includes an adjustment device configured to provide a selected voltage, a memory configured to store a selector, and a processor coupled to the memory and to the adjustment device. The processor is configured to receive the selector from the memory, select an operational parameter of the circuit protection device based on the selector, receive a voltage value representative of a selected voltage provided by the adjustment device, and set the selected operational parameter to a parameter value based on the voltage value received.

In another aspect, a method of configuring a circuit protection device including an adjustment device, a memory, and a processor is provided. The method includes receiving a selector from the memory, selecting an operational parameter of the circuit protection device based on the selector, receiving a voltage value representative of a selected voltage provided by the adjustment device, and setting the selected operational parameter to a parameter value based on the voltage value received.

DETAILED DESCRIPTION OF THE INVENTION

Exemplary embodiments of a circuit protection device and methods of configuring the circuit protection device are described herein. In an exemplary embodiment, the circuit protection device includes an adjustment device coupled to a controller through an analog to digital converter (ADC). The controller includes a memory and a selector stored in the memory. The selector is used to determine which operational parameter of the circuit protection device is controlled by the adjustment device. The selector may be overwritten or replaced within the memory to cause a different operational parameter to be controlled by the adjustment device. The operational parameter controlled by the adjustment device is set to a parameter value based on a selected voltage provided by the adjustment device. Accordingly, the adjustment device is able to be "remapped" to, or associated with, a selectable operational parameter of the circuit protection device to enable a variety of product configurations to be implemented for the circuit protection device.

Figure 1:
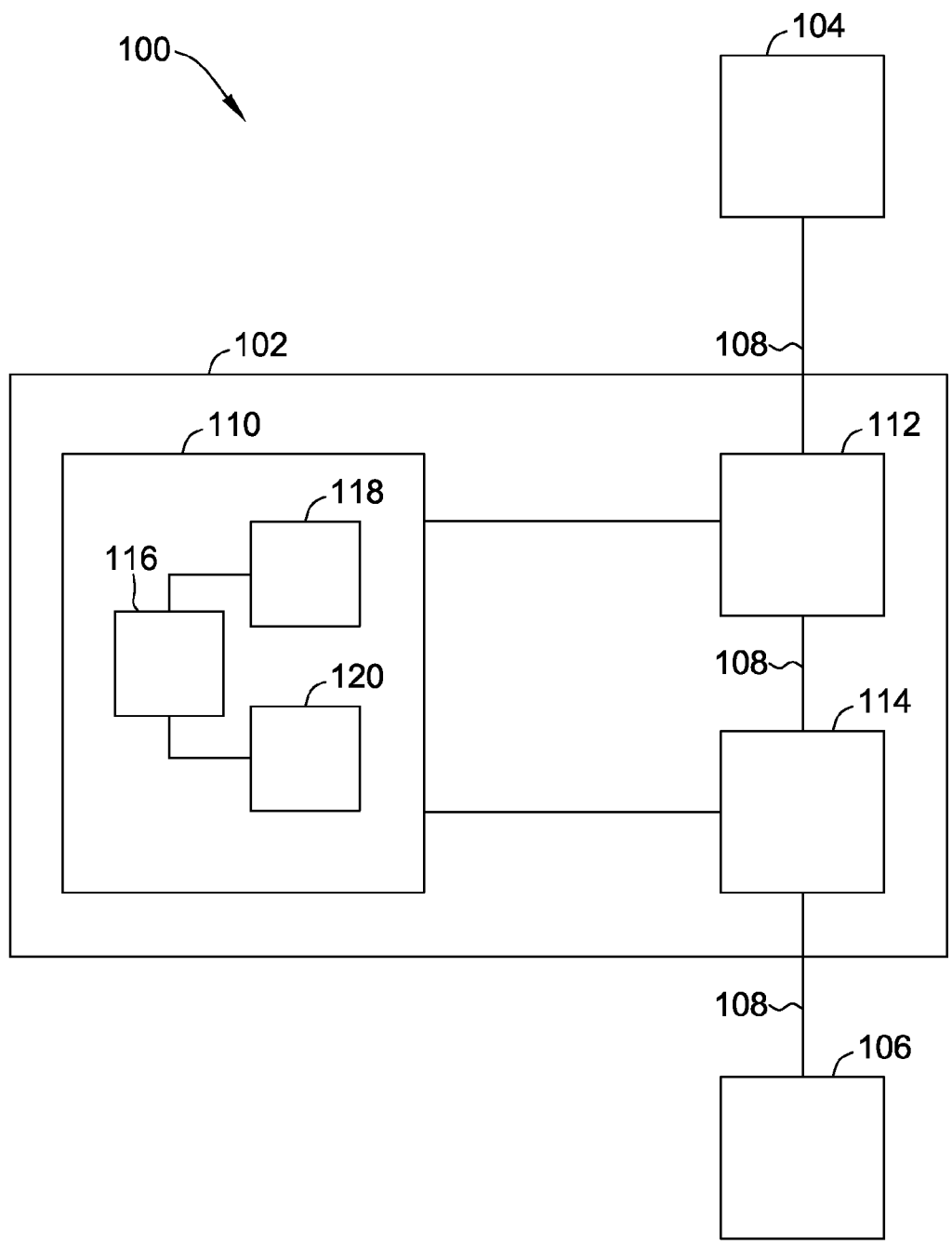
FIG. 1 is a block diagram of an exemplary power distribution system.

FIG. 1 is a schematic block diagram of a portion of an exemplary power distribution system 100 illustrating a circuit protection device 102, an electrical power source 104, and a load 106. While a single circuit protection device 102, a single electrical power source 104, and a single load 106 are illustrated within FIG. 1, it should be recognized that any suitable number of circuit protection devices 102, electrical power sources 104, and loads 106 may be included within power distribution system 100.

Electrical power source 104 may include, for example, one or more generators or other devices that provide electrical current (and resulting electrical power) to load 106. In an exemplary embodiment, the electrical current is transmitted to load 106 through one or more electrical distribution lines or busses 108 coupled to circuit protection device 102. Load 106 may include, but is not limited to only including, machinery, motors, lighting, and/or other electrical and mechanical equipment of a manufacturing or power generation or distribution facility.

Circuit protection device 102 is configured to programmably control a delivery of power from electrical power source 104 to load 106. In an exemplary embodiment, circuit protection device 102 is a circuit breaker. Alternatively, circuit protection device 102 may be any other device that enables power distribution system 100 to function as described herein. In an exemplary embodiment, circuit protection device 102 includes a controller 110 (sometimes referred to as a "trip unit") operatively coupled to a sensor 112 and a trip mechanism 114. Controller 110, in an exemplary embodiment, includes a processor 116 coupled to a memory 118. In one embodiment, a display device 120 is also coupled to processor 116.

Sensor 112, in an exemplary embodiment, is a current sensor, such as a current transformer, a Rogowski coil, a Hall-effect sensor, and/or a shunt that measures a current flowing through trip mechanism 114. Alternatively, sensor 112 may include any other sensor that enables power distribution system 100 to function as described herein. In an exemplary embodiment, each sensor 112 generates a signal representative of the measured or detected current (hereinafter referred to as a "current signal") flowing through an associated trip mechanism 114. In addition, sensor 112 transmits the current signal to processor 116. Processor 116 is programmed to activate trip mechanism 114 to interrupt a current provided to a load 106 if the current signal, and/or the current represented by the current signal, exceeds a programmable current or current-time threshold.

Trip mechanism 114 includes, for example, one or more circuit breaker devices and/or arc containment devices. Exemplary circuit breaker devices include, for example, circuit switches, contact arms, and/or circuit interrupters that interrupt current flowing through trip mechanism 114 to a load 106 coupled to trip mechanism 114. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Processor 116 controls the operation of circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores data and/or instructions that are usable by processor 116 to control circuit protection device 102. In an exemplary embodiment, memory 118 includes non-volatile memory, such as flash memory and/or Electrically Erasable Programmable Read Only Memory (EEPROM). Additionally or alternatively, memory 118 may include magnetic RAM (MRAM), ferroelectric RAM (FeRAM), read only memory (ROM), and/or any other type of memory that enables circuit protection device 102 to function as described herein.

In one embodiment, display device 120 includes one or more light-emitting diodes (LEDs) that indicate a status of circuit protection device 102 and/or trip mechanism 114. For example, processor 116 may activate one or more components (e.g., LEDs) of display device 120 to indicate that circuit protection device 102 and/or trip mechanism 114 is active and/or operating normally, that a fault or failure has occurred, and/or any other status of trip mechanism 114 and/or circuit protection device 102. Additionally or alternatively, display device 120 may display an indication (using one or more LEDs, for example) of an operational parameter of circuit protection device 102 that an adjustment device is configured to control, as described more fully herein. In one embodiment, display device 120 is replaced by one or more printed stickers or labels that identify the operational parameter or parameters of circuit protection device 102 that one or more adjustment devices are configured to control.

Figure 2:
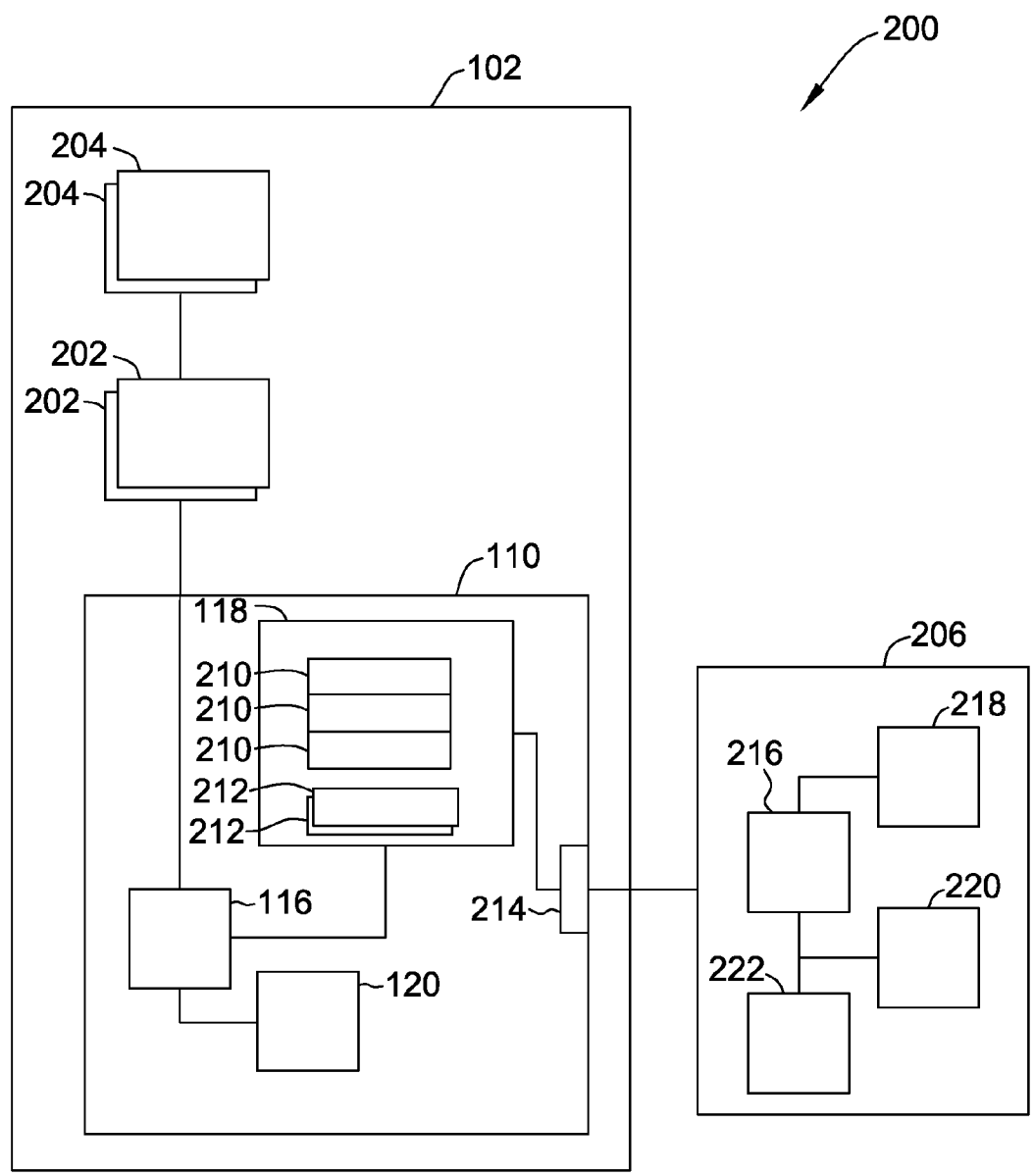
FIG. 2 is a block diagram of an exemplary configuration system that may be used with the power distribution system shown in FIG. 1.

FIG. 2 is a block diagram of an exemplary configuration system 200 that may be used with power distribution system 100 (shown in FIG. 1). In an exemplary embodiment, configuration system 200 includes controller 110, at least one analog to digital converter (ADC) 202 coupled to controller 110, and at least one adjustment device 204 coupled to ADC 202. In an exemplary embodiment, ADC 202 and adjustment device 204 are included within circuit protection device 102. In addition, configuration system 200 includes a programming device 206 that is configured to be coupled to controller 110.

In an exemplary embodiment, adjustment device 204 is a potentiometer that is adjustable to provide a selectable voltage to ADC 202. Alternatively, adjustment device 204 is a dual inline or rotary switch, or another device that provides a selectable voltage. In an exemplary embodiment, a user operates adjustment device 204 to selectably control the voltage provided from adjustment device 204 to ADC 202. In one embodiment, a plurality of adjustment devices 204 are included that enable a user to independently control a voltage provided from each adjustment device 204 to ADC 202 (or to a plurality of ADCs 202).

ADC 202 receives the selected voltage from adjustment device 204 and converts the voltage to a digital output (hereinafter referred to as a "voltage value"). The voltage value is transmitted to processor 116 through a bus 208. In an exemplary embodiment, bus 208 is an 8 bit bus. Alternatively, bus 208 may have any width that enables configuration system 200 to function as described herein. In an alternative embodiment, such as an embodiment in which adjustment device 204 includes a dual inline or rotary switch, ADC 202 is not included. Rather, adjustment device 204 includes a plurality of outputs that represent a binary or a binary coded decimal signal that is transmitted directly to processor 116 through bus 208 in place of the voltage value.

In an exemplary embodiment, memory 118 stores a value 210 of one or more operational parameters (referred to herein as "parameter values") of circuit protection device 102. The operational parameters may include, without limitation, a long time pickup threshold, a short time pickup threshold, an instantaneous pickup threshold, one or more time bands for a pickup threshold, and/or one or more trip curve characteristics for circuit protection device 102. In an exemplary embodiment, parameter values 210 stored in memory 118 are default, or preprogrammed, values of the operational parameters.

In an exemplary embodiment, one or more selectors 212 are also stored within memory 118. Selector 212 is a code, an instruction, a value, and/or another suitable indicator that identifies which operational parameter is controlled by adjustment device 204. The operational parameter controlled by adjustment device 204 receives a value based on, or using, the voltage value received from adjustment device 204, rather than from a parameter value 210 stored within memory 118. In contrast, the operational parameters of circuit protection device 102 that are not controlled by adjustment device 204 receive values from associated parameter values 210 stored in memory 118. Selector 212 may be changed, or reprogrammed, such that a different operational parameter is controlled by adjustment device 204. If an operational parameter is no longer controlled by adjustment device 204, the operational parameter receives a value from an associated parameter value 210 in memory 118.

Processor 116 receives the voltage value from ADC 202 and sets a value for the operational parameter selected or identified by selector 212 using the voltage value. More specifically, in an exemplary embodiment, processor 116 converts the voltage value to a percentage of the maximum voltage value receivable from ADC 202. For example, in an embodiment in which bus 208 is an 8 bit bus, the maximum voltage value is 255. Processor 116 references a table or another data structure to determine a conversion factor for the voltage value using the selected operational parameter. Processor 116 multiplies the percentage by the conversion factor to calculate the value for the selected operational parameter, and sets the selected operational parameter to the calculated value.

In an exemplary embodiment, controller 110 includes a programming port 214 coupled to memory 118. Programming port 214 may be externally accessible by a customer or another user after assembly of circuit protection device 102, for example, or may only be accessible during manufacturing and/or assembly of circuit protection device 102 (or at another stage in which a cover (not shown) of circuit protection device 102 is removed). Programming port 214 receives data from programming device 206 and stores and/or updates data in memory 118 with the data received. For example, parameter values 210 and/or selector 212 are stored and/or updated in memory 118 using data received from programming device 206 through programming port 214.

In an exemplary embodiment, programming device 206 includes a processor 216, a memory 218, a display device 220, and/or a user input device 222. Processor 216 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory 218 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory 218 includes data and/or instructions that are usable by processor 216 to enable processor 216 to perform the functions described herein.

Display device 220 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying data and/or text to a user. User input device 222 includes, without limitation, a keyboard, a keypad, a touch-sensitive screen, a mouse, a scroll wheel, a pointing device, an audio input device employing speech-recognition software, and/or any suitable device that enables a user to input data into programming device 206.

During operation, a user, such as a manufacturer, operates user input device 222 to input data to be transmitted to controller 110. Alternatively, the user may operate user input device 222 to select preloaded data within memory 218 to be transmitted to controller 110. In an exemplary embodiment, processor 216 causes the data to be transmitted to controller 110 through programming port 214. The data is stored within memory 118 of controller 110, thus replacing one or more parameter values 210 and/or selector 212 within memory 118. Processor 116 of controller 110 uses the new parameter values 210 and/or selector 212 during operation of circuit protection device 102. In an exemplary embodiment, programming device 206 generates a label or a sticker, for example, that may be affixed to circuit protection device 102 to identify the parameter that is controlled by adjustment device 204.

In one embodiment, a plurality of adjustment devices 204 controls a plurality of operational parameters. For example, a first adjustment device 204 may be associated with a first operational parameter by a first selector 212 such that a first parameter value 210 (associated with the first operational parameter) is set to a voltage value received from first adjustment device 204. Similarly, a second adjustment device 204 may be associated with a second operational parameter by a second selector 212 such that a second parameter value 210 (associated with the second operational parameter) is set to a voltage value received from second adjustment device 204.

In another embodiment, a single adjustment device 204 controls a plurality of operational parameters such that a voltage value received from adjustment device 204 is used to set parameter values 210 associated with each of the operational parameters. Parameter values 210 may each be set to the same value based on the voltage value, or parameter values 210 may be set to values that are ratios of each other, or that are proportional to each other, based on the voltage value. For example, a first pickup threshold, such as a long time pickup threshold, may be set to a value between about 0.4 times a current rating of circuit protection device 102 and about equal to the current rating of circuit protection device 102. A second pickup threshold, such as a short time pickup threshold, may be set to a value proportional to the first pickup threshold value, such as a value between about 2.4 times the current rating of circuit protection device 102 and about 6 times the current rating of circuit protection device 102.

It should be recognized that replacement parameter values 210 and/or selector 212 may be stored in memory 118 at a customer site, at a manufacturing site, and/or at any other suitable location. Accordingly, a manufacturer or another entity may provide circuit protection device 102 in a variety of configurations or stocking control units (SKUs), and/or may reprogram circuit protection device 102 as desired to satisfy various customer requirements.

Figure 3:
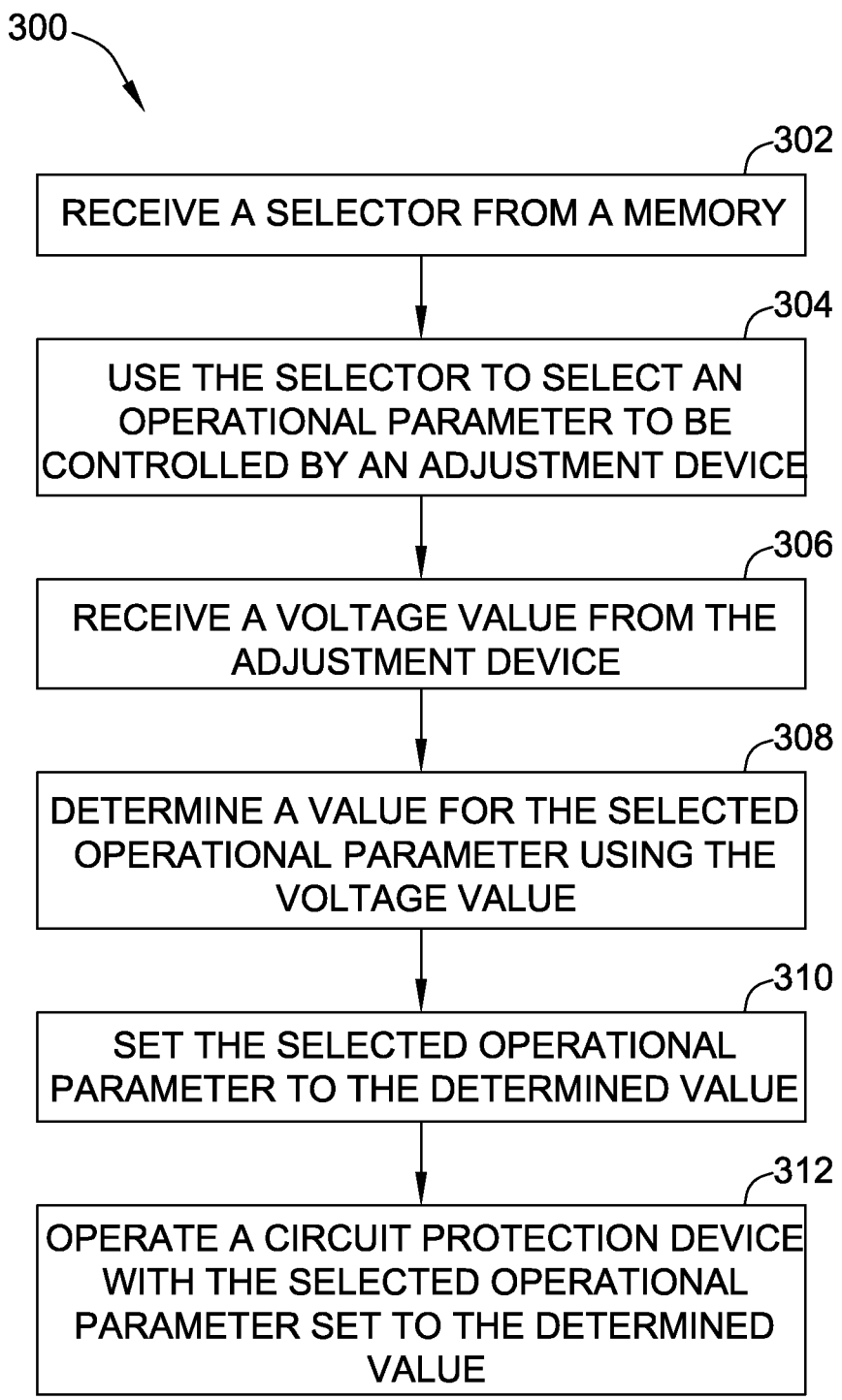
FIG. 3 is a flow diagram of an exemplary method of configuring a circuit protection device, such as the circuit protection device shown in FIG. 1.

FIG. 3 is a flow diagram of an exemplary method 300 of configuring a circuit protection device, such as circuit protection device 102 (shown in FIG. 1). In an exemplary embodiment, method 300 is executed by controller 110 of circuit protection device 102.

Method 300 includes receiving 302 a selector 212 (shown in FIG. 2) from memory 118. For example, selector 212 may be stored within memory 118 by programming device 206 (shown in FIG. 2) and/or by any other device. In one embodiment, a first selector may be stored within memory 118 during an initial configuration process, for example. The first selector may be overwritten by a second selector received at a later time from a device external to circuit protection device 102, such as from programming device 206. The second selector is received through programming port 214, for example, and replaces the first selector. In such an embodiment, processor 116 receives 302 the second selector from memory 118. In addition, operational parameter values may be received from programming device 206 (or another device) and may be stored within memory 118 as parameter values 210 (shown in FIG. 2). If pre-existing parameter values 210 are stored within memory 118, the pre-existing parameter values 210 are replaced by the values received from programming device 206.

In an exemplary embodiment, processor 116 uses 304 selector 212 to select an operational parameter to be controlled by an adjustment device, such as adjustment device 204 (shown in FIG. 2). In one embodiment, the operational parameter is one of a plurality of operational parameters of circuit protection device 102. In such an embodiment, if selector 212 is replaced by a second, or later, selector as described above, processor 116 selects a different operational parameter that is associated with, or that corresponds to, the second selector.

A user may operate adjustment device 204 to adjust a voltage output of adjustment device 204. The voltage output is converted by ADC 202 (shown in FIG. 2) to a digital voltage value. Processor 116 receives 306 the voltage value from adjustment device 204 (through ADC 202) and determines 308 a value for the selected operational parameter using the voltage value. Processor 116 sets 310 the selected operational parameter to the determined value. If the selected operational parameter had previously been set to a different value, processor 116 changes, or sets, the operational parameter to the determined value upon the determination that selector 212 is associated with the operational parameter.

Circuit protection device 102 operates 312 with the selected operational parameter set to the determined value. In one embodiment, controller 110 causes display device 120 to display an indication that the selected operational parameter is controlled by adjustment device 204 (i.e., that the selected operational parameter is set to a parameter value using the voltage value received from adjustment device 204).

A technical effect of the methods and systems described herein may include one or more of: (a) receiving a selector from a memory; (b) selecting an operational parameter of a circuit protection device using a selector; (c) receiving a voltage value representative of a selected voltage provided by an adjustment device; and (d) setting a selected operational parameter to a parameter value using a voltage value received.

Exemplary embodiments of a circuit protection device and methods of configuring a circuit protection device are described above in detail. The circuit protection device and methods are not limited to the specific embodiments described herein but, rather, components of the circuit protection device and/or operations of the methods may be utilized independently and separately from other components and/or operations described herein. Further, the described components and/or operations may also be defined in, or used in combination with, other systems, methods, and/or devices, and are not limited to practice with only the power distribution system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:
an adjustment device configured to provide a selected voltage;
a memory configured to store a selector; and
a processor coupled to said memory and to said adjustment device, said processor configured to:
receive the selector from said memory, the selector identifying one of a plurality of operational parameters to be adjusted;
select the identified operational parameter of said circuit protection device based on the selector;
receive a voltage value representative of a selected voltage provided by said adjustment device; and
set the operational parameter identified by the selector received from said memory to a parameter value based on the voltage value received from said adjustment device.

2. A circuit protection device in accordance with claim 1, wherein the selector is a first selector, said circuit protection device configured to receive a second selector and replace the first selector within said memory with the second selector.

3. A circuit protection device in accordance with claim 2, wherein the identified operational parameter is a first operational parameter of the plurality of operational parameters of said circuit protection device, said processor is configured to receive the second selector from said memory and to select a second operational parameter of the plurality of operational parameters based on the second selector.

4. A circuit protection device in accordance with claim 3, wherein the parameter value is a first parameter value, said processor configured to set the second operational parameter to a second parameter value based on the voltage value received.

5. A circuit protection device in accordance with claim 1, wherein said processor is configured to select the identified operational parameter to be one of a pickup threshold of said circuit protection device, a time band for the pickup threshold, and a trip curve characteristic for said circuit protection device.

6. A circuit protection device in accordance with claim 1, further comprising a programming port for receiving the selector from a device external to said circuit protection device.

7. A circuit protection device in accordance with claim 1, further comprising an analog to digital converter (ADC) coupled to said adjustment device and to said processor, said ADC configured to receive the selected voltage from said adjustment device, convert the selected voltage to the voltage value, and transmit the voltage value to said processor.

8. A circuit protection device in accordance with claim 1, wherein said processor is configured to set a plurality of pickup thresholds based on the identified operational parameter, wherein a first pickup threshold of the plurality of pickup thresholds is set to a value that is proportional to a value of a second pickup threshold of the plurality of pickup thresholds based on the voltage value.

9. A circuit protection device in accordance with claim 1, wherein said adjustment device is a first adjustment device, said circuit protection device comprises a second adjustment device, and the identified operational parameter is a first operational parameter, said processor being configured to set the first operational parameter to a first parameter value based on said first adjustment device and to set a second operational parameter to a second parameter value based on said second adjustment device.

10. A method of configuring a circuit protection device including an adjustment device, a memory, and a processor, said method comprising:
receiving, by the processor, a selector from the memory, the selector identifying one of a plurality of operational parameters to be adjusted;
selecting, by the processor, the identified operational parameter of the circuit protection device based on the selector;

receiving, by the processor, a voltage value representative of a selected voltage provided by the adjustment device; and setting, by the processor, the operational parameter identified by the selector received from the memory to a parameter value based on the voltage value received from the adjustment device.

11. A method in accordance with claim 10, wherein the selector is a first selector stored within the memory, said method further comprising receiving a second selector and replacing the first selector with the second selector.

12. A method in accordance with claim 11, wherein the identified operational parameter is a first operational parameter of the plurality of operational parameters of the circuit protection device, said method further comprising receiving the second selector from the memory and selecting a second operational parameter of the plurality of operational parameters based on the second selector.

13. A method in accordance with claim 12, wherein the parameter value is a first parameter value, said method further comprising setting the second operational parameter to a second parameter value based on the voltage value received.

14. A method in accordance with claim 10, further comprising selecting the identified operational parameter to be one of a pickup threshold of the circuit protection device, a time band for the pickup threshold, and a trip curve characteristic for the circuit protection device.

15. A method in accordance with claim 10, wherein the circuit protection device includes a programming port, said method further comprising receiving the selector from a device external to the circuit protection device through the programming port.

16. A method in accordance with claim 15, wherein the parameter value is a first parameter value, said method further comprising receiving a second parameter value for the identified operational parameter from the device external to the circuit protection device through the programming port.

17. A method in accordance with claim 16, said method comprising:

setting the identified operational parameter to the second parameter value; and changing the value of the identified operational parameter to the first parameter value upon a determination that the selector is associated with the identified operational parameter.

18. A method in accordance with claim 10, wherein the circuit protection device includes an analog to digital converter (ADC) coupled to the adjustment device and to the processor, said method further comprising receiving, by the ADC, the selected voltage from the adjustment device, converting, by the ADC, the selected voltage to the voltage value, and transmitting, by the ADC, the voltage value to the processor.

19. A method in accordance with claim 10, further comprising setting a plurality of pickup thresholds based on the identified operational parameter, wherein a first pickup threshold of the plurality of pickup thresholds is set to a value that is proportional to a value of a second pickup threshold of the plurality of pickup thresholds based on the voltage value.

20. A method in accordance with claim 10, wherein the adjustment device is a first adjustment device and the circuit protection device includes a second adjustment device, and the identified operational parameter is a first operational parameter, said method further comprising setting the first operational parameter to a first parameter value based on the first adjustment device and setting a second operational parameter to a second parameter value based on the second adjustment device.

\* \* \* \* \*